Patented Nov. 4, 1930

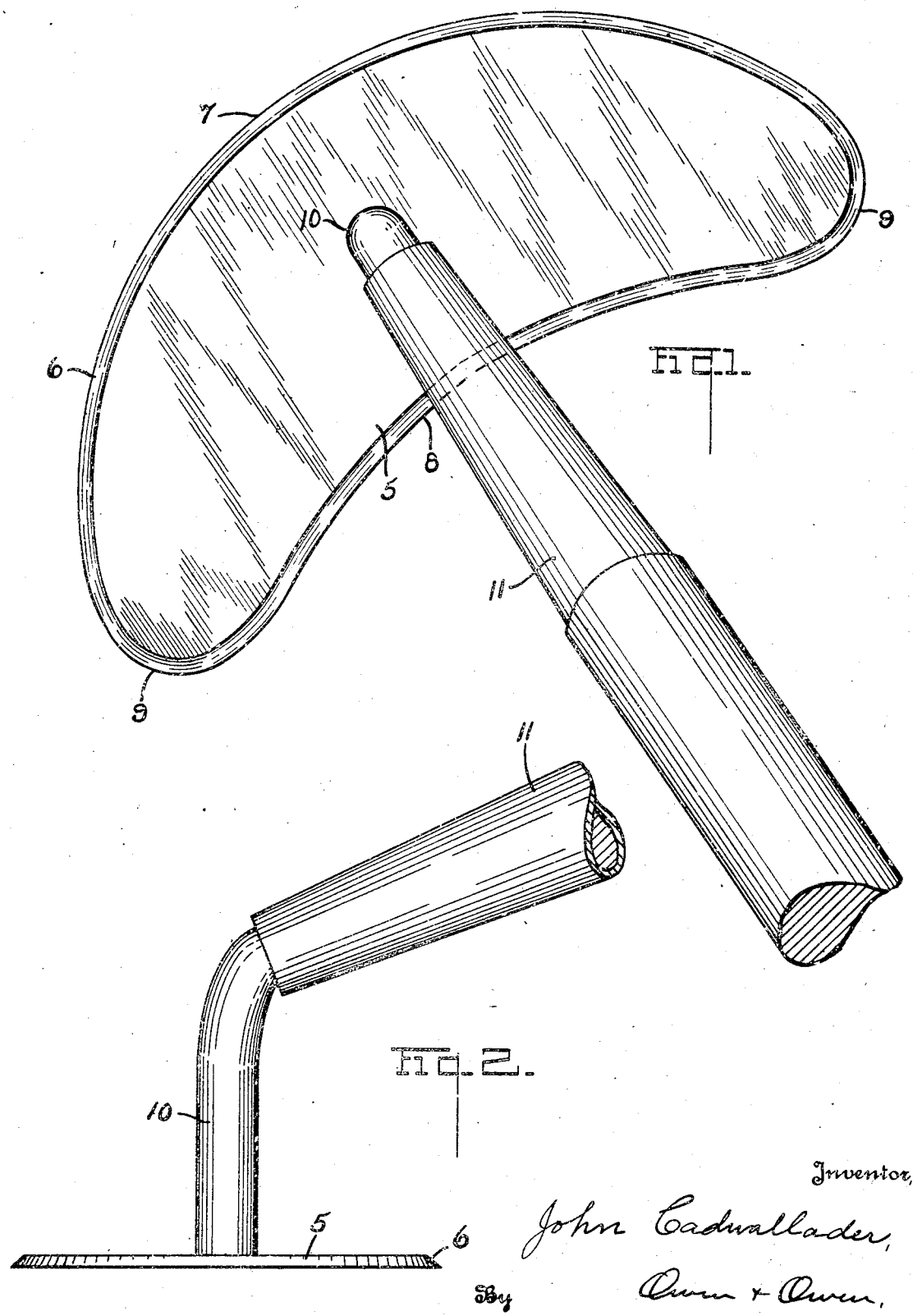

1,780,741

UNITED STATES PATENT OFFICE

JOHN CADWALLADER, OF TIFFIN, OHIO, ASSIGNOR TO THE MONARCH MANUFACTURING COMPANY, OF TIFFIN, OHIO, A CORPORATION OF OHIO

WEED CUTTER

Application filed March 7, 1929. Serial No. 344,951.

This invention relates to a weed cutter in the form of a hand tool adapted to be used in connection with the cultivation of growing crops for cutting the weeds at or near the surface of the ground.

The primary object of the invention is to provide a tool which may be used rapidly and effectively in a cultivated field or garden for destroying weeds, and which may be manipulated in close proximity to the growing plants without danger of injuring the same. The advantages of the invention result chiefly from the novel and improved shape of the cutting blade and its angular relation to the handle. These advantages will be more particularly explained in connection with the accompanying drawings, in which Figure 1 is a plan view of the invention in the position in which it is ordinarily held.

Figure 2 is a side elevation of the same.

As illustrated in the drawings, the invention comprises a flat blade 5, preferably of steel, and having a cutting edge 6, beveled toward the bottom face of the blade and extending around its entire periphery. The front and rear edges of the blade, indicated at 7 and 8 respectively, are substantially arcuate in shape with the centers of the arcs both on the same side of the blade, the edge 8 having a greater radius than the edge 7. The end edges 9 on both faces of the blade are in the form of convex curves which merge into the front and rear edges 7 and 8 respectively. Thus it will be seen that the blade 5 differs in shape from a crescent in having comparatively broad rounded ends instead of cusps, and also in having the concave edge 8 of greater radius than the convex edge 7. A shank 10 is secured to the center of the blade 5, substantially perpendicular thereto, with its upper end bent rearwardly at an oblique angle and secured to the handle 11. Thus the handle is disposed at such an angle that when it is held naturally in the hands the blade 5 will be disposed at or near the surface of the ground and parallel thereto, with the convex edge 7 in front and the concave edge 8 at the rear or on the side toward the free end of the handle.

It will be readily seen that in using a tool of this kind the blade will skim over the surface of the ground or just beneath the same and cut the weeds, and the ends 9 may be inserted between the growing plants and into close proximity to the same, leaving very few weeds to be pulled by hand. The comparatively broad ends 9 have the advantage that when they come in contact with the weeds, the direction of movement of the blade will be substantially perpendicular to the cutting edge so that the latter will cut the weeds instead of being diverted toward one side as is often the case with a cutting blade which has a sharp angular point. The concave edge 8 has the advantage that when the tool is drawn toward the operator, either directly or at an angle, the weeds encountered thereby will be drawn inwardly toward the center and positively cut by a shearing action, whereas with a straight, convex or angular cutting edge the tool is often diverted to one side or the other without cutting the weeds, especially when the weeds are rather tough or the soil is rather hard.

From the foregoing description it will be seen that I have provided a tool which may be manipulated more effectively and with greater accuracy than garden tools now ordinarily used, and that the weeds may be destroyed much more rapidly and with less hand pulling than has hitherto been done. While I have shown and described the various features of the invention in considerable detail, it is apparent that the same may be modified to a considerable extent without departing from the scope of the invention as claimed.

What I claim is:

In a tool of the class described, the combination of a handle with a flat blade secured to one end thereof at such an angle that it engages the ground substantially parallel with the surface thereof when the handle is held naturally in the hands of the operator, said blade having opposite arcuate edges, the centers of both arcs being in a line directly beneath the handle when so held, the inner arc having the greater radius, both faces of said blade having broad rounded ends merging into said arcuate edges, the entire peripheral edge of the blade being beveled toward the bottom surface thereof.

In testimony whereof I have hereunto signed my name to this specification.

JOHN CADWALLADER.